United States Patent
Lee et al.

(10) Patent No.: US 11,661,510 B2
(45) Date of Patent: May 30, 2023

(54) THERMOPLASTIC RESIN COMPOSITION AND MOLDED PRODUCT MANUFACTURED THEREFROM

(71) Applicant: LOTTE CHEMICAL CORPORATION, Seoul (KR)

(72) Inventors: Eun Joo Lee, Uiwang-si (KR); Yun Jeong Yang, Uiwang-si (KR); Young Chul Kwon, Uiwang-si (KR); Dong Hyun Park, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 540 days.

(21) Appl. No.: 16/771,356

(22) PCT Filed: Dec. 11, 2018

(86) PCT No.: PCT/KR2018/015707
§ 371 (c)(1),
(2) Date: Jun. 10, 2020

(87) PCT Pub. No.: WO2019/124857
PCT Pub. Date: Jun. 27, 2019

(65) Prior Publication Data
US 2020/0347220 A1    Nov. 5, 2020

(30) Foreign Application Priority Data

Dec. 22, 2017 (KR) .................. 10-2017-0177877
Aug. 2, 2018 (KR) .................. 10-2018-0090265

(51) Int. Cl.
| C08L 55/02 | (2006.01) |
| B29C 45/00 | (2006.01) |
| C08G 77/04 | (2006.01) |
| C08L 83/04 | (2006.01) |
| B29K 55/02 | (2006.01) |

(52) U.S. Cl.
CPC .......... C08L 55/02 (2013.01); B29C 45/0001 (2013.01); C08G 77/045 (2013.01); C08L 83/04 (2013.01); B29K 2055/02 (2013.01)

(58) Field of Classification Search
CPC ........ C08L 51/04; C08L 55/02; C08K 5/5419
See application file for complete search history.

(56) References Cited

U.S. PATENT DOCUMENTS

| 9,790,364 B2 | 10/2017 | Lee et al. | |
| 10,035,907 B2 | 7/2018 | Park | |
| 2007/0135589 A1* | 6/2007 | DeRudder | ............... C08L 69/00 525/464 |
| 2010/0331475 A1 | 12/2010 | Hong et al. | |
| 2013/0231414 A1 | 9/2013 | Park et al. | |
| 2015/0028266 A1 | 1/2015 | Jung et al. | |
| 2017/0088704 A1 | 3/2017 | Park | |
| 2020/0199331 A1* | 6/2020 | Tanaka | ..................... C08L 25/06 |

FOREIGN PATENT DOCUMENTS

| EP | 2235104 B1 | 5/2017 |
| KR | 10-2008-0080116 A | 9/2008 |
| KR | 10-2009-0073978 A | 7/2009 |
| KR | 10-1346688 B1 | 12/2013 |
| KR | 10-1452020 B1 | 10/2014 |
| KR | 10-2015-0072114 A | 6/2015 |
| KR | 10-1668327 B1 | 10/2016 |
| KR | 10-2017-0020668 A | 2/2017 |
| KR | 10-2017-0036842 A | 4/2017 |
| KR | 10-2017-0039048 A | 4/2017 |
| WO | 2019/124857 A2 | 6/2019 |

OTHER PUBLICATIONS

International Search Report in counterpart International Application No. PCT/KR2018/015707 dated May 24, 2019, pp. 1-4.
Office Action in counterpart Korean Application No. 10-2018-0090265 dated Aug. 21, 2020, pp. 1-4.
Extended Search Report in counterpart European Application No. 18892868.3 dated Aug. 13, 2021, pp. 1-7.

* cited by examiner

*Primary Examiner* — Kuo Liang Peng
(74) *Attorney, Agent, or Firm* — Additon, Pendleton & Witherspoon, P.A.

(57) ABSTRACT

A thermoplastic resin composition of the present invention is characterized by comprising: a base resin containing a rubber-modified vinyl-based graft copolymer, a large-diameter rubber polymer having an average particle size of about 3 to about 8 μm, and an aromatic vinyl-based copolymer resin; and polyorganosilsesquioxane fine particles having an average particle size of about 0.1 to about 10 μm. The thermoplastic resin composition is excellent in low gloss, weather resistance, and the like.

12 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2018/015707, filed Dec. 11, 2018, which published as WO 2019/124857 on Jun. 27, 2019, Korean Patent Application No. 10-2017-0177877, filed in the Korean Intellectual Property Office on Dec. 22, 2017, and Korean Patent Application No. 10-2018-0090265, filed in the Korean Intellectual Property Office on Aug. 2, 2018, the entire disclosure of each of which is incorporated herein by reference.

TECHNICAL FIELD

The present invention relates to a thermoplastic resin composition and a molded product manufactured therefrom. More particularly, the present invention relates to a thermoplastic resin composition having good properties in terms of low gloss, weather resistance, and the like, and a molded product manufactured therefrom.

BACKGROUND ART

Thermoplastic resin compositions have lower specific gravity than glass or metal, good moldability, and good impact resistance, and are useful for housings of electrical/electronic products, automotive interior/exterior materials, and exterior materials for buildings.

In addition, there is increasing demand for unpainted materials which can provide desired appearance and surface characteristics, such as color, gloss, and the like, without any additional process in order to achieve eco-friendliness and reduction in process costs. In particular, there is need for development of low gloss products capable of satisfying consumer demand for luxurious appearance in the fields of interior/exterior materials of automobiles and electrical/electronic products, exterior materials for buildings, and the like.

In order to reduce surface gloss of a molded product (interior/exterior materials and the like) formed of a thermoplastic resin composition without any subsequent painting process, rubber particles in the thermoplastic resin composition may be formed to several micrometers or more, or a highly crosslinked matting agent and/or an inorganic matting agent such as talc may be added to the thermoplastic resin composition. However, a thermoplastic resin composition prepared using an excess of a typical matting agent can cause deterioration in external appearance of a product formed thereof due to the matting agent protruding from the surface of the product.

Moreover, since a molded product formed of such a thermoplastic resin composition can suffer from deterioration in physical properties, such as discoloration, over time, a method for improving weather resistance (discoloration resistance) has been studied. As the method for improving weather resistance, an acrylic rubber polymer may be used as a rubber polymer of a rubber-modified aromatic vinyl copolymer resin or a weathering stabilizer may be added.

However, as the content of the acrylic rubber polymer increases, the acrylic rubber-modified aromatic vinyl copolymer resin can cause deterioration in impact strength and is not economically feasible due to increase in cost. Moreover, since an excess of the weathering stabilizer can cause deterioration in external appearance and mechanical properties due to gas generation, the weathering stabilizer has a problem of difficulty in increase in amount thereof.

Therefore, there is a need for development of a thermoplastic resin composition having good properties in terms of low gloss, weather resistance, and the like without deterioration in external appearance.

The background technique of the present invention is disclosed in Korean Patent No. 10-1452020 and the like.

DISCLOSURE

Technical Problem

It is one aspect of the present invention to provide a thermoplastic resin composition having good properties in terms of low gloss, weather resistance, and the like.

It is another aspect of the present invention to provide a molded product formed of the thermoplastic resin composition.

The above and other aspects of the present invention can be achieved by the present invention described below.

Technical Solution

1. One aspect of the present invention relates to a thermoplastic resin composition. The thermoplastic resin composition includes: a base resin including a rubber-modified vinyl graft copolymer, a large-diameter rubber polymer having an average particle diameter of about 3 μm to about 8 μm, and an aromatic vinyl copolymer resin; and fine polyorganosilsesquioxane particles having an average particle diameter of about 0.1 μm to about 10 μm.

2. In Embodiment 1, the thermoplastic resin composition may include about 100 parts by weight of the base resin including about 30 wt % to about 70 wt % of the rubber-modified vinyl graft copolymer, about 1 wt % to about 15 wt % of the large-diameter rubber polymer, and about 25 wt % to about 65 wt % of the aromatic vinyl copolymer resin; and about 0.1 to about 10 parts by weight of the fine polyorganosilsesquioxane particles.

3. In Embodiment 1 or 2, the rubber-modified vinyl graft copolymer may be prepared by graft polymerization of a monomer mixture including an aromatic vinyl monomer and a vinyl cyanide monomer to a rubber polymer having an average particle diameter of about 100 nm to about 600 nm.

4. In Embodiments 1 to 3, the rubber-modified vinyl graft copolymer may be an acrylonitrile-butadiene-styrene graft copolymer (g-ABS) or an acrylate-styrene-acrylonitrile graft copolymer (g-ASA).

5. In Embodiments 1 to 4, the large-diameter rubber polymer may be present in the form of a rubber-modified aromatic vinyl copolymer resin (a mixture of a large-diameter rubber polymer having a dispersed phase and an average particle diameter of about 3 μm to about 8 μm and an aromatic vinyl copolymer resin having a continuous phase) prepared through continuous solution polymerization of a rubber polymer having a viscosity of about 150 cP or more in a 5 wt % styrene solution, an aromatic vinyl monomer, and a monomer copolymerizable with the aromatic vinyl monomer.

6. In Embodiments 1 to 5, the aromatic vinyl copolymer resin may be a polymer of an aromatic vinyl monomer and a monomer copolymerizable with the aromatic vinyl monomer.

7. In Embodiments 1 to 6, the fine polyorganosilsesquioxane particles may be prepared by mixing an organochlorosilane with an organotrialkoxysilane to form a mixture containing about 100 ppm to about 2,000 ppm of the organochlorosilane, and mixing water with the mixture to form a transparent sol while maintaining pH of the mixture in the range of about 8 to about 11.

8. In Embodiments 1 to 7, the fine polyorganosilsesquioxane particles may have an average particle diameter of about 4 µm to about 7 µm.

9. In Embodiments 1 to 8, the thermoplastic resin composition may have a gloss of about 5% to about 25%, as measured on a 1.5 mm thick specimen at an angle of 60° in accordance with ASTM D523.

10. In Embodiments 1 to 9, the thermoplastic resin composition may have a color variation ($\Delta E$) of about 0.5 to about 3.0, as calculated by Equation 1 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weathering testing for 2,000 hours in accordance with ASTM D4459.

$$\text{Color variation } (\Delta E) = \sqrt{(\Delta L^*)^2 + (\Delta a^*)^2 + (\Delta b^*)^2} \quad \text{[Equation 1]}$$

where $\Delta L^*$ is a difference ($L_1^* - L_0^*$) between L* values before/after weathering test; $\Delta a$ is a difference ($a_1^* - a_0^*$) between a* values before/after weathering test; and $\Delta b$ is a difference ($b_1^* - b_0^*$) between b* values before/after weathering test.

11. In Embodiments 1 to 10, the rubber-modified vinyl graft copolymer, the large-diameter rubber polymer and the fine polyorganosilsesquioxane particles may be present as dispersed phases in a continuous phase including the aromatic vinyl copolymer resin.

12. Another aspect of the present invention relates to a molded product. The molded product is formed of the thermoplastic resin composition according to any one of Embodiments 1 to 11.

Advantageous Effects

The present invention provides a thermoplastic resin composition having good properties in terms of low gloss, weather resistance, and the like, and a molded product formed therefrom.

BEST MODE

Hereinafter, embodiments of the present invention will be described in detail.

A thermoplastic resin composition according to the present invention includes: (A) a base resin including (A1) a rubber-modified vinyl graft copolymer, (A2) large-diameter rubber polymer, and (A3) an aromatic vinyl copolymer resin; and (B) fine polyorganosilsesquioxane particles.

As used herein to represent a specific numerical range, the expression "a to b" means "≥a and ≤b".

(A) Base Resin

According to the present invention, the base resin may include the rubber-modified vinyl graft copolymer (A1), the large-diameter rubber polymer (A2), and the aromatic vinyl copolymer resin (A3).

(A1) Rubber-Modified Aromatic Vinyl Graft Copolymer

The rubber-modified vinyl graft copolymer according to one embodiment of the invention serves to improve impact resistance and chemical resistance of the thermoplastic resin composition, and may be obtained by graft polymerization of a monomer mixture including an aromatic vinyl monomer and a vinyl cyanide monomer to a rubber polymer. For example, the rubber-modified vinyl graft copolymer may be obtained by graft polymerization of the monomer mixture including the aromatic vinyl monomer and the vinyl cyanide monomer to the rubber polymer, in which the monomer mixture may further include a monomer for imparting processability and heat resistance to the monomer mixture, as needed. Here, polymerization may be performed by any typical polymerization method, such as emulsion polymerization, suspension polymerization, and the like. In addition, the rubber-modified vinyl graft copolymer may have a core (rubber polymer)-shell (copolymer of the monomer mixture) structure, without being limited thereto.

In some embodiments, the rubber polymer may include, for example, diene rubbers (rubber polymer), such as polybutadiene, poly(styrene-butadiene), and poly(acrylonitrile-butadiene); saturated rubbers obtained by adding hydrogen to the diene rubbers; isoprene rubbers; acrylic rubbers (rubber polymer), such as poly(butyl acrylate) and the like; and ethylene-propylene-diene monomer terpolymer (EPDM), without being limited thereto. These may be used alone or as a mixture thereof. For example, the rubber polymer may include diene rubbers and acrylic rubbers, specifically polybutadiene and poly(butyl acrylate).

In some embodiments, the rubber polymer (rubber particle) may have an average particle diameter (D50) of about 100 nm to about 600 nm, for example, about 200 nm to about 400 nm, as measured using a particle size analyzer. Within this range, the thermoplastic resin composition can have good properties in terms of impact resistance, external appearance, and the like.

In some embodiments, the rubber polymer may be present in an amount of about 20 wt % to about 70 wt %, for example, about 30 wt % to about 65 wt %, based on 100 wt % of the rubber-modified vinyl graft copolymer, and the monomer mixture (including the aromatic vinyl monomer and the vinyl cyanide monomer) may be present in an amount of about 30 wt % to about 80 wt %, for example, about 35 wt % to about 70 wt %, based on 100 wt % of the rubber-modified vinyl graft copolymer. Within this range, the thermoplastic resin composition can have good properties in terms of impact resistance, external appearance, and the like.

In some embodiments, the aromatic vinyl monomer is a monomer copolymerizable with the rubber copolymer and may include, for example, styrene, α-methylstyrene, β-methylstyrene, p-methylstyrene, p-t-butylstyrene, ethylstyrene, vinyl xylene, monochlorostyrene, dichlorostyrene, dibromostyrene, and vinyl naphthalene, without being limited thereto. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile and methacrylonitrile. The vinyl cyanide monomer may be present in an amount of about 10 wt % to about 90 wt %, for example, about 10 wt % to about 60 wt %, based on 100 wt % of the monomer mixture.

Within this range, the thermoplastic resin composition can have good properties in terms of chemical resistance, mechanical properties, and the like.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the rubber-modified vinyl graft copolymer may include, for example, an acrylonitrile-butadiene-styrene graft copolymer (g-ABS), an acrylate-styrene-acrylonitrile graft copolymer (g-ASA), and the like.

In some embodiments, the rubber-modified vinyl graft copolymer may be present in an amount of about 30 wt % to about 70 wt %, for example, about 35 wt % to about 65 wt %, based on 100 wt % of the base resin (including the rubber-modified vinyl graft copolymer (A1), the large-diameter rubber polymer (A2) and the aromatic vinyl copolymer resin (A3)). Within this range, the thermoplastic resin composition can exhibit good properties in terms of low gloss, external appearance, impact resistance, flowability (molding processability), and the like.

(A2) Large-Diameter Rubber Polymer

The large-diameter rubber polymer according to one embodiment of the invention may have an average particle diameter (D50, volume average) of about 3 µm to about 8 µm, for example, about 4 µm to about 7 µm, as measured using a particle size analyzer, and serves to improve low gloss properties of the thermoplastic resin composition. If the average particle diameter of the large-diameter rubber polymer is less than about 3 µm, the thermoplastic resin composition can suffer from deterioration in low gloss properties, and if the average particle diameter of the large-diameter rubber polymer exceeds about 8 µm, the thermoplastic resin composition can suffer from deterioration in impact resistance and the like.

In some embodiments, the large-diameter rubber polymer may be present in the thermoplastic resin composition in the form of a rubber-modified aromatic vinyl copolymer resin (a mixture of the large-diameter rubber polymer (A2) having a dispersed phase and an average particle diameter of about 3 µm to about 8 µm and some or all of the aromatic vinyl copolymer resin (A3) having a continuous phase) prepared by continuous solution polymerization of a rubber polymer having a viscosity of about 150 cP or more in a 5 wt % styrene solution, an aromatic vinyl monomer, and a monomer copolymerizable with the vinyl cyanide monomer.

Specifically, the rubber-modified aromatic vinyl copolymer resin may be prepared by mixing a polymerization initiator and a molecular weight regulator with a mixed solution of the rubber polymer, the aromatic vinyl monomer, the monomer copolymerizable with the aromatic vinyl monomer, and a solvent to prepare a reaction solution; introducing the reaction solution into a first reactor, followed by polymerization to a conversion ratio of about 30% to about 40%; and introducing a polymerized product prepared in the first reactor into a second reactor, followed by polymerization to a conversion ratio of about 70% to about 80%.

In some embodiments, the mixed solution may include about 3 wt % to about 15 wt % of the rubber polymer, about 50 wt % to about 85 wt % of the aromatic vinyl monomer and the monomer copolymerizable with the aromatic vinyl monomer, and about 5 wt % to about 30 wt % of the solvent.

In some embodiments, the rubber polymer included in the mixed solution may include, for example, diene rubbers (rubber polymers), such as polybutadiene, poly(styrene-butadiene), and poly(acrylonitrile-butadiene); saturated rubbers obtained by adding hydrogen to the diene rubbers; isoprene rubbers; acrylic rubbers (rubber polymers), such as polybutyl acrylate; and ethylene-propylene-diene terpolymer (EPDM), without being limited thereto. These may be used alone or as a mixture thereof. For example, the rubber polymer may be diene rubbers, specifically, polybutadiene rubbers. In addition, the rubber polymer may have a viscosity of about 150 cP or more in a 5 wt % styrene solution, for example, about 150 cP to about 300 cP, specifically about 160 cP to about 200 cP. Within this range of viscosity in the styrene solution, the large-diameter rubber polymer can be prepared.

In some embodiments, the aromatic vinyl monomer included in the mixed solution may include styrene, α-methylstyrene, β-methylstyrene, p-methylstyrene, p-t-butylstyrene, ethylstyrene, vinyl xylene, monochlorostyrene, dichlorostyrene, dibromostyrene, and vinyl naphthalene, without being limited thereto. These may be used alone or as a mixture thereof.

In some embodiments, the monomer copolymerizable with the aromatic vinyl monomer included in the mixed solution may include, for example, vinyl cyanide monomers, such as acrylonitrile, methacrylonitrile, ethacrylonitrile, phenyl acrylonitrile, α-chloroacrylonitrile, fumaronitrile, and the like. These may be used alone or as a mixture thereof.

In some embodiments, the aromatic vinyl monomer may be present in an amount of about 20 wt % to about 90 wt %, for example, about 30 wt % to about 80 wt %, based on 100 wt % of the aromatic vinyl monomer and the monomer copolymerizable with the aromatic vinyl monomer, and the monomer copolymerizable with the aromatic vinyl monomer may be present in an amount of about 10 wt % to about 80 wt %, for example, about 20 wt % to about 70 wt %, based on 100 wt % of the aromatic vinyl monomer and the monomer copolymerizable with the aromatic vinyl monomer.

In some embodiments, the solvent may be an aromatic organic solvent. For example, ethyl benzene, xylene, or toluene may be used as the solvent. These may be used alone or as a mixture thereof.

In some embodiments, the polymerization initiator preferably has a half-life of 10 minutes or less at a reactor polymerization temperature and may include, for example, radical initiators, such as 1,1-bis(t-butylperoxy)-2-methylcyclohexane, 1,1-bis(t-butylperoxy)cyclohexane, 2-bis(4,4-di-t-butylperoxy cyclohexane)propane, t-hexylperoxy isopropyl monocarbonate, t-butylperoxy maleic acid, t-butylperoxy-3,5,5-trimethylhexanoate, t-butylperoxy laurate, 2,5-dimethyl-2,5-bis(m-toluoylperoxy)hexane, t-butylperoxy isopropyl monocarbonate, t-butylperoxy 2-ethylhexyl monocarbonate, t-hexylperoxy benzoate, 2,5-dimethyl-2,5-bis(benzoylperoxy)hexane, t-butylperoxy acetate, 2,2-bis(t-butylperoxy)butane, t-butylperoxy benzoate, n-butyl-4,4-bis (t-butylperoxy)valerate, and mixtures thereof. The polymerization initiator may be present in an amount of about 0.007 parts by weight to about 0.07 parts by weight, for example, about 0.01 parts by weight to about 0.05 parts by weight, relative to about 100 parts by weight of the mixed solution. Within this range, deterioration in appearance characteristics due to remaining polymerization initiator can be reduced.

In some embodiments, the molecular weight regulator may include alkyl mercaptans, such as t-dodecyl mercaptan and n-dodecyl mercaptan. The molecular weight regulator may be present in an amount of about 0.02 parts by weight to about 1 part by weight, for example, about 0.03 parts by weight to about 0.5 parts by weight, relative to about 100 parts by weight of the mixed solution.

In some embodiments, the continuous solution polymerization is preferably performed while circulating a refrigerant through a jacket, a coil, or the like, so as to control exothermic reaction that can occur in the reactors during the polymerization process.

In some embodiments, the reaction solution with the polymerization initiator and the molecular weight regulator added thereto may be polymerized to a conversion ratio of about 30% to about 40%, for example, about 32% to about 38%, in the first reactor. Within this range, stable polymerization can be achieved without excessive load of a stirrer.

In some embodiments, a reaction temperature in the first reactor may range from about 60° C. to about 150° C., for example, about 70° C. to about 130° C. Here, the reaction temperature may be varied depending on the type of reactor, stirring rate, the type of polymerization initiator used, and the like.

In some embodiments, a stirring rate in the first reactor may range from about 60 rpm to about 150 rpm, for example, about 80 rpm to about 120 rpm, specifically about 90 rpm to about 130 rpm. Here, the stirring rate may be varied depending on reactor size, the type of polymerization initiator used, reaction temperature, and the like. Within this range, the large-diameter rubber polymer can be prepared.

In some embodiments, the polymerized product prepared in the first reactor may be polymerized to a conversion ratio of about 70% to about 80% in the second reactor. Within this range, the large-diameter rubber polymer can be prepared.

In some embodiments, a reaction temperature in the second reactor may range from about 80° C. to about 170° C., for example, about 120° C. to about 160° C. Here, the reaction temperature may be varied depending on the type of reactor, stirring rate, the type of polymerization initiator used, and the like.

In some embodiments, a stirring rate in the second reactor may range from about 50 rpm to about 100 rpm, for example, about 60 rpm to about 95 rpm, specifically about 65 rpm to about 90 rpm. Here, the stirring rate may be varied depending on reactor size, the type of polymerization initiator used, reaction temperature, and the like. Within this range, the large-diameter rubber polymer can be prepared.

In some embodiments, the continuous solution polymerization may further include removing unreacted monomers and a solvent residue by devolatilizing a polymerized product prepared in the second reactor. Here, the devolatilization process may be performed using a devolatilization tank. In one embodiment, the devolatilization process may be performed using a single devolatilization tank. In another embodiment, the devolatilization process may be performed using a first devolatilization tank and a second devolatilization tank vertically connected to each other to remove a remaining unreacted material. Through the devolatilization process, the content of residual monomers in the polymerized product may be reduced to about 1,500 ppm or less, for example, about 1,000 ppm or less, and specifically about 700 ppm or less.

In some embodiments, the devolatilization tank (devolatilization device) is preferably a fall-stranding type devolatilization tank (DEVO). Here, the angle of a cone of the fall-stranding type devolatilization tank is set to minimize retention time in the devolatilization tank and to effectively transfer a devolatilized product to an underlying gear pump.

In some embodiments, the first devolatilization tank and the second devolatilization tank may be vertically connected to each other to minimize a connection line between the DEVOs. In addition, it is desirable that the first devolatilization tank DV-1 be provided with a control valve or a regulator to regulate pressure thereof.

In some embodiments, the first devolatilization tank may be operated under conditions of a pressure of about 100 torr to about 600 torr, for example, about 200 torr to about 500 torr, a temperature of about 160° C. to about 240° C., for example, about 180° C. to about 220° C., and a retention time of about 10 minutes or less. Within these ranges, reduction in impurities such as remaining monomers and high productivity can be achieved. In addition, the second devolatilization tank may be operated under conditions of a pressure of about 1 torr to about 50 torr, a temperature of about 210° C. to about 250° C., and a retention time of about 10 minutes or less, for example, 5 minutes or less. Within these ranges, the prepared rubber-modified aromatic vinyl copolymer resin can have good properties in terms of color and the like.

In some embodiments, the aromatic vinyl copolymer resin in the rubber-modified aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength and moldability.

Here, the aromatic vinyl copolymer in the rubber-modified aromatic vinyl copolymer resin may have the same composition as the aromatic vinyl copolymer resin (A3), and a separate (second) aromatic vinyl copolymer resin other than the (first) aromatic vinyl copolymer resin of the rubber-modified aromatic vinyl copolymer resin may be added to the base resin to allow the content of the aromatic vinyl copolymer resin (A3) in the thermoplastic resin composition to fall within the range specified herein.

In some embodiments, the large-diameter rubber polymer may be present in an amount of about 1 wt % to about 15 wt %, for example, about 2 wt % to about 10 wt %, based on 100 wt % of the base resin ((A1), (A2), and (A3)). Within this range, the thermoplastic resin composition can have good low-gloss properties, appearance characteristics, impact resistance, and flowability (moldability).

(A3) Aromatic Vinyl Copolymer Resin

The aromatic vinyl copolymer resin according to one embodiment of the present invention may include an aromatic vinyl copolymer resin used in typical rubber-modified vinyl copolymer resins. For example, the aromatic vinyl copolymer resin may be a polymer of a monomer mixture including an aromatic vinyl monomer and a monomer copolymerizable with the aromatic vinyl monomer, such as a vinyl cyanide monomer. Here, the aromatic vinyl copolymer resin (A3) may include the aromatic vinyl copolymer resin of the rubber-modified aromatic vinyl copolymer resin (a mixture of the large-diameter rubber polymer having an average particle diameter of about 3 μm to about 8 μm and having a dispersed phase and the aromatic vinyl copolymer resin having a continuous phase); and a separate aromatic vinyl copolymer resin, which is added to the base resin to allow the content of the aromatic vinyl copolymer resin (A3) in the thermoplastic resin composition to fall within the range specified herein.

In some embodiments, the separate aromatic vinyl copolymer resin may be prepared by mixing an aromatic vinyl monomer with a monomer copolymerizable with the aromatic vinyl monomer, followed by polymerization. Here, polymerization may be performed by any polymerization method known in the art, such as emulsion polymerization, suspension polymerization, and bulk polymerization.

In some embodiments, the aromatic vinyl monomer may include, for example, styrene, α-methylstyrene, β-methylstyrene, p-methylstyrene, p-t-butylstyrene, ethylstyrene, vinyl xylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good impact resistance, flowability, and the like.

In some embodiments, the monomer copolymerizable with the aromatic vinyl monomer may include, for example, vinyl cyanide monomers, such as acrylonitrile, methacrylonitrile, ethacrylonitrile, phenylacrylonitrile, α-chloroacrylonitrile, fumaronitrile, and the like. These may be used alone or as a mixture thereof. The monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good impact resistance, flowability, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, moldability, and the like.

In some embodiments, the aromatic vinyl copolymer resin may be present in an amount of about 25 wt % to about 65 wt %, for example, about 30 wt % to about 60 wt %, based on 100 wt % of the base resin ((A1), (A2) and (A3)). Within this range, the thermoplastic resin composition can exhibit good properties in terms of low gloss, external appearance, impact resistance, flowability (molding processability), and the like.

The base resin according to one embodiment of the present invention may have a structure in which the rubber-modified vinyl graft copolymer (A1) and the large-diameter rubber polymer (A2) are present as dispersed phases in the aromatic vinyl copolymer resin (A3) having a continuous phase. For example, the base resin may be prepared by preparing a rubber-modified aromatic vinyl copolymer resin in which the large-diameter rubber polymer (A2, dispersed phase) is dispersed in the aromatic vinyl copolymer resin (A3, continuous phase), followed by adding the rubber-modified vinyl graft copolymer (A1) thereto, wherein a separate aromatic vinyl copolymer resin (A3) may be added to the base resin to allow the content of the corresponding component of the base resin to fall within the range specified herein.

(B) Fine Polyorganosilsesquioxane Particles

The fine polyorganosilsesquioxane particles according to the present invention serve to improve low gloss properties and weather resistance of the thermoplastic resin composition and may have an average particle diameter (D50) of about 0.1 μm to about 10 μm, for example, about 4 μm to about 7 μm, as measured by a particle size analyzer. If the fine polyorganosilsesquioxane particles have an average particle diameter of less than about 0.1 μm, the thermoplastic resin composition can suffer from deterioration in low gloss properties, and if the fine polyorganosilsesquioxane particles have an average particle diameter of larger than about 0.1 μm, the thermoplastic resin composition can suffer from deterioration in impact resistance, flowability, and the like.

In some embodiments, the fine polyorganosilsesquioxane particles may be prepared by mixing an organochlorosilane with an organotrialkoxysilane to form a mixture containing about 100 ppm to about 2,000 ppm of the organochlorosilane, and mixing water with the mixture to form a transparent sol while maintaining pH of the mixture in the range of about 8 to about 11.

In some embodiments, the organotrialkoxysilane may be represented by Formula 1:

$$R^1Si(OR^2)_3 \quad \text{[Formula 1]}$$

where $R^1$ is a $C_1$ to $C_6$ alkyl group, a vinyl group, or a $C_6$ to $C_{10}$ aryl group; and $R^2$ is a $C_1$ to $C_5$ alkyl group. For example, $R^1$ may be a methyl group, an ethyl group or a phenyl group, and $R^2$ may be a methyl group, an ethyl group, a propyl group, or a butyl group. Specifically, it is desirable that $R^1$ and $R^2$ be methyl groups in terms of productivity.

In some embodiments, the organotrialkoxysilane may be present in an amount of about 5 wt % to about 50 wt %, for example, about 10 wt % to about 30 wt %, based on the total amount of the reaction solution. Within this range, reaction yield and the average particle diameter can be easily adjusted.

In some embodiments, the organochlorosilane may be obtained through partial or entire substitution of an alkoxy group with a chlorine group and may be represented by Formula 2.

$$R^1Si(OR^2)_{3-x}Cl_x \quad \text{[Formula 2]}$$

where $R^1$ is a $C_1$ to $C_6$ alkyl group, a vinyl group, or a $C_6$ to $C_{10}$ aryl group; $R^2$ is a $C_1$ to $C_5$ alkyl group; and x ranges from 1 to 3.

For example, the organochlorosilane may be obtained through entire substitution of all alkoxy groups with chlorine groups.

In some embodiments, the organochlorosilane may be mixed in an amount of about 100 ppm to about 2,000 ppm with the organotrialkoxysilane. Within this range, the fine polyorganosilsesquioxane particles can be formed to a desirable size and treatment of impurities can be easily performed.

In some embodiments, mixing may be performed using a highly efficient mixer. As the highly efficient mixer, a high speed emulsification/dispersion device, such as a homomixer, a homogenizer, and a micro-fluidizer, or a stirring device manufactured through combination of a flat panel type impeller and a baffle plate may be used.

In some embodiments, after preparation of the transparent sol, the pH value of the transparent sol may be adjusted to about 8 to about 11, for example, about 9 to about 10, using a general basic solution (an aqueous solution of an alkali metal or alkali earth-metal, hydrogen carbonate, ammonia or the like), thereby preparing the fine polyorganosilsesquioxane particles. Within this range of pH, the fine polyorganosilsesquioxane particles can be prepared without dissolution of fine particles.

In some embodiments, final fine polyorganosilsesquioxane particles may be obtained through filtration, water washing and drying after the preparation of the fine polyorganosilsesquioxane particles. Drying may be performed using a spray drier or a spin flash drier in order to form the fine particles in the form of powder without a separate disintegration process while preventing agglomeration of the fine particles.

In some embodiments, the fine polyorganosilsesquioxane particles may be present in an amount of about 0.1 to about 10 parts by weight, for example, about 1 to about 8 parts by weight, relative to about 100 parts by weight of the base resin. Within this range, the thermoplastic resin composition can have good weather resistance and low gloss properties.

The thermoplastic resin composition according to the present invention may further include additives used in typical thermoplastic resin compositions. Examples of the additives may include matting agents, weather stabilizers, flame retardants, fillers, antioxidants, anti-dripping agents, lubricants, release agents, nucleating agents, antistatic agents, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the base resin.

The thermoplastic resin composition according to one embodiment of the present invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a structure in which the rubber-modified vinyl graft copolymer (A1), the large-diameter rubber polymer (A2), and the fine polyorganosilsesquioxane particles (B) are present as dispersed phases in the aromatic vinyl copolymer resin (A3) having a continuous phase.

In some embodiments, the thermoplastic resin composition may have a gloss of about 25% or less, for example, about 5% to about 25%, as measured on a 1.5 mm thick specimen at an angle of 60° in accordance with ASTM D523.

In some embodiments, the thermoplastic resin composition may have a color variation ($\Delta E$) of about 0.5 to about 3.0, for example, about 1.0 to about 2.5, as calculated by Equation 1 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weathering testing for 2,000 hours in accordance with ASTM D4459.

$$\text{Color variation } (\Delta E) = \sqrt{(\Delta L^*)^2 + (\Delta a^*)^2 + (\Delta b^*)^2} \quad \text{[Equation 1]}$$

where $\Delta L^*$ is a difference ($L_1^* - L_0^*$) between L* values before/after weathering test; $\Delta a$ is a difference ($a_1^* - a_0^*$) between a* values before/after weathering test; and $\Delta b$ is a difference ($b_1^* - b_0^*$) between b* values before/after weathering test.

A molded product according to the present invention may be formed of the thermoplastic resin composition set forth above. The thermoplastic resin composition may be prepared in pellet form. The prepared pellets may be produced into various molded products (articles) by various molding methods, such as injection molding, extrusion, vacuum molding, and casting. Such molding methods are well known to those skilled in the art. The molded product has good low-gloss properties, weather resistance, impact resistance, and flowability (moldability), and thus is useful as interior/exterior materials for electrical/electronic products, interior/exterior materials for automobiles, and exterior materials for buildings, which require low-gloss properties and weather resistance.

MODE FOR INVENTION

Next, the present invention will be described in more detail with reference to some examples. It should be understood that these examples are provided for illustration only and are not to be in any way construed as limiting the invention.

EXAMPLE

Details of components used in Examples and Comparative Examples are as follows.

(A) Base Resin (A1) Rubber-Modified Aromatic Vinyl Graft Copolymer

A g-ABS copolymer obtained by graft-copolymerization of 55 wt % of styrene and acrylonitrile (weight ratio: 75/25) to 45 wt % of butyl acrylate rubber (average particle size: 310 nm) was used.

(A2) Large-Diameter Rubber Polymer (A2-1) 8.8 parts by weight of butadiene rubber (BR-1, ASADENE 55AE) having a viscosity of 170 cP in a 5 wt % styrene solution was dissolved in a mixed solution consisting of 53.4 parts by weight of a styrene monomer, 17.8 parts by weight of an acrylonitrile monomer, and 20 parts by weight of ethyl benzene as a reaction solvent, followed by adding 0.015 parts by weight of 1,1-bis(t-butylperoxy)cyclohexane as a polymerization initiator and 0.07 parts by weight of t-dodecyl mercaptan as a molecular weight regulator, thereby preparing a mixed solution. The prepared mixed solution was introduced into reactors at a rate of 25 kg/hr. In a first reactor, the prepared mixed solution was subjected to stirring at a rate of 130 rpm and polymerization to a conversion ratio of 35%. In a second reactor, the resulting product prepared in the first reactor was subjected to stirring at a rate of 70 rpm and polymerization to a conversion ratio of 75%, followed by removal of remaining unreacted material through a devolatilization tank, thereby preparing a rubber-modified aromatic vinyl copolymer resin (ABS resin, a mixture of a large-diameter rubber polymer (A2-1, dispersed phase) and an aromatic vinyl copolymer resin (SAN resin, A3-1, continuous phase), dispersed phase:continuous phase: 12 wt %:88 wt %) in pellet form. Here, the large-diameter rubber polymer (A2-1) had an average particle diameter of 5.16 μm and the SAN resin (A3-1) had a weight average molecular weight of 130,000 g/mol.

(A2-2) A rubber-modified aromatic vinyl copolymer resin (ABS resin, a mixture of a large-diameter rubber polymer (A2-2, dispersed phase) and an aromatic vinyl copolymer resin (SAN resin, A3-2, continuous phase), dispersed phase:continuous phase: 12 wt %:88 wt %) was prepared in the same manner as in preparation of (A2-1), except that the stirring rate in the first reactor was changed to 100 rpm. Here, the large-diameter rubber polymer (A2-2) had an average particle diameter of 8.58 μm and the SAN resin (A3-2) had a weight average molecular weight of 130,000 g/mol.

(A2-3) A rubber-modified aromatic vinyl copolymer resin (ABS resin, a mixture of a large-diameter rubber polymer (A2-3, dispersed phase) and an aromatic vinyl copolymer resin (SAN resin, A3-3, continuous phase), dispersed phase:

continuous phase: 12 wt %:88 wt %) was prepared in the same manner as in preparation of (A2-1), except that a butadiene rubber (BR-2: ASAPRENE 700A) having a viscosity of 45 cP in a 5 wt % styrene solution was used. Here, the large-diameter rubber polymer (A2-3) had an average particle diameter of 1.37 μm and the SAN resin (A3-3) had a weight average molecular weight of 130,000 g/mol.

Here, the average particle diameter of the rubber-modified aromatic vinyl graft copolymer (A1) and the large-diameter rubber polymer (A2) refers to a volume average particle size measured using a particle size analyzer (Mastersizer S Ver.2.14 manufactured by Malvern Instruments Ltd.).

(A3) Aromatic Vinyl Copolymer Resin

A SAN resin (weight average molecular weight: 130,000 g/mol) obtained by typical suspension polymerization of 75 wt % of styrene with 25 wt % of acrylonitrile was used as an additional aromatic vinyl copolymer resin other than the SAN resin described above (A3-1, A3-2, or A3-3).

(B) Fine Polyorganosilsesquioxane Particles (B1) 280 g of a mixed solution prepared by mixing 500 ppm of methyltrichlorosilane with methyltrimethoxysilane was mixed with 1,720 g of an ion exchange resin. Then, the mixture was stirred at 10,000 rpm for 1 minute in a homogenizer, followed by adding 0.08 phr of aqueous ammonia to adjust pH of the mixture to 9.6, and the resulting product was left for 4 hours. Then, the resulting product was subjected to filtration and water washing and dried using a spray drier, thereby preparing white fine polyorganosilsesquioxane particles (average particle diameter: 5.5 μm). An average particle diameter (volume average, D50) was measured using a particle size analyzer (Beckman Coulter Co., Ltd., Laser Diffraction Particle Size Analyzer LS 13 320).

(B2) Fine polyorganosilsesquioxane particles (average particle diameter: 15 μm) prepared by the same method as in B1 except that 0.02 phr of aqueous ammonia was used for regulation of pH were used.

(B3) Fine polyorganosilsesquioxane particles (average particle diameter: 0.05 μm) prepared by the same method as in B1 except that 5 phr of aqueous ammonia was used for regulation of pH were used.

(C) Matting Agent

A PS/SAN copolymer (Manufacturer: Chemtura Co., Ltd., Product Name: BLENDEX® BMAT) was used.

Examples 1 to 3 and Comparative Examples 1 to 5

The aforementioned components were mixed in amounts as listed in Table 1 and subjected to extrusion molding at 230° C., thereby preparing a thermoplastic resin composition in pellet form. Here, the base resin (A) was prepared by preparing a rubber-modified aromatic vinyl copolymer resin in which large-diameter rubber polymer (A2-1, A2-2 and A2-3, dispersed phase) is dispersed in an aromatic vinyl copolymer resin (A3-1, A3-2 and A3-3, continuous phase), followed by adding a rubber-modified vinyl graft copolymer (A1, dispersed phase) and an aromatic vinyl copolymer resin (A3, continuous phase) thereto.

Extrusion was performed using a twin-screw extruder (L/D: 36, (D: 45 mm) and the prepared pellets were dried at 80° C. for 2 hours or more and then subjected to injection molding using a 6 oz. injector (molding temperature: 230° C., mold temperature: 60° C.), thereby preparing a specimen. The prepared specimen was evaluated as to the following properties. Results are shown in Table 1.

Property Evaluation (1) Gloss (surface gloss, unit: %): Gloss was measured at an angle of 60° using a gloss meter (BYK-Gardner, BYK Chemie) in accordance with ASTM D523.

(2) Weather resistance (color variation (ΔE)): Color variation (ΔE) was calculated by Equation 1 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weathering testing for 2,000 hours in accordance with ASTM D4459.

$$\text{Color variation } (\Delta E) = \sqrt{(\Delta L^*)^2 + (\Delta a^*)^2 + (\Delta b^*)^2} \quad \text{[Equation 1]}$$

where ΔL* is a difference ($L_1^* - L_0^*$) between L* values before/after weathering test; Δa is a difference ($a_1^* - a_0^*$) between a* values before/after weathering test; and Δb is a difference ($b_1^* - b_0^*$) between b* values before/after weathering test.

(3) Notched Izod impact strength (unit: kgf·cm/cm): Notched Izod impact strength was measured on a ¼" thick notched Izod specimen in accordance with ASTM D256.

(4) Melt-flow index (MI, unit: g/10 min): Melt-flow index was measured at a temperature of 220° C. under a load of 10 kgf in accordance with ASTMD1238.

TABLE 1

| | | Example | | | Comparative Example | | | | |
|---|---|---|---|---|---|---|---|---|---|
| | | 1 | 2 | 3 | 1 | 2 | 3 | 4 | 5 |
| (A) | (A1) | 50 | 50 | 50 | 50 | 50 | 50 | 50 | 50 |
| (wt %) | (A2-1) | 4.8 | 4.8 | 4.8 | 4.8 | 4.8 | 4.8 | — | — |
| | (A2-2) | — | — | — | — | — | — | 4.8 | — |
| | (A2-3) | — | — | — | — | — | — | — | 4.8 |
| | (A3-1) | 35.2 | 35.2 | 35.2 | 35.2 | 35.2 | 35.2 | — | — |
| | (A3-2) | — | — | — | — | — | — | 35.2 | — |
| | (A3-3) | — | — | — | — | — | — | — | 35.2 |
| | (A3) | 10 | 10 | 10 | 10 | 10 | 10 | 10 | 10 |
| (B) | (B1) | 2 | 6 | 8 | — | — | — | 6 | 6 |
| (parts by | (B2) | — | — | — | 6 | — | — | — | — |
| weight) | (B3) | — | — | — | — | 6 | — | — | — |
| (C) (parts by weight) | | — | — | — | — | — | 6 | — | — |
| Gloss (%) | | 25 | 10 | 5 | 10 | 40 | 30 | 8 | 15 |
| Color variation (ΔE) | | 2.5 | 1.2 | 1.0 | 2.5 | 3.0 | 4.0 | 1.5 | 1.2 |
| Notched Izod impact strength | | 40 | 30 | 20 | 15 | 10 | 10 | 30 | 10 |
| Melt index | | 10 | 5.0 | 3.0 | 1.5 | 10 | 3.0 | 1.5 | 6.0 |

Parts by weight: parts by weight relative to 100 parts by weight of base resin A From the results, it could be seen that the thermoplastic resin composition according to the present invention had good properties in terms of low gloss, weather resistance, impact resistance, flowability (processability), and the like.

On the contrary, it could be seen that the thermoplastic resin composition of Comparative Example 1 prepared using the fine polyorganosilsesquioxane particles (B2) having an average particle diameter of larger than 10 μm (15 μm) suffered from deterioration in impact resistance, flowability, and the like; the thermoplastic resin composition of Comparative Example 2 prepared using the fine polyorganosilsesquioxane particles (B3) having an average particle diameter of less than 0.1 μm (0.05 μm) suffered from deterioration in low gloss, weather resistance, impact resistance, and the like; and the thermoplastic resin composition of Comparative Example 3 prepared using the matting agent (PS/SAN copolymer (C)) instead of using the fine polyorganosilsesquioxane particles suffered from deterioration in low gloss, weather resistance, impact resistance, flowability, and the like. Further, it could be seen that the thermoplastic resin composition of Comparative Example 4 prepared using the large-diameter rubber polymer (A2-2) having an average particle diameter of 8.58 μm suffered from deterioration in flowability and the like; and the thermoplastic resin composition of Comparative Example 5 prepared using the large-diameter rubber polymer (A2-3) having an average particle diameter of 1.37 μm suffered from deterioration in impact resistance and the like.

It should be understood that various modifications, changes, alterations, and equivalent embodiments can be made by those skilled in the art without departing from the spirit and scope of the present invention.

The invention claimed is:

1. A thermoplastic resin composition comprising:
   a base resin comprising a rubber-modified vinyl graft copolymer, a large-diameter rubber polymer having an average particle diameter of about 3 μm to about 8 μm, and an aromatic vinyl copolymer resin; and
   fine polyorganosilsesquioxane particles having an average particle diameter of about 0.1 μm to about 10 μm.

2. The thermoplastic resin composition according to claim 1, comprising:
   100 parts by weight of the base resin comprising about 30 wt % to about 70 wt % of the rubber-modified vinyl graft copolymer, about 1 wt % to about 15 wt % of the large-diameter rubber polymer, and about 25 wt % to about 65 wt % of the aromatic vinyl copolymer resin; and
   about 0.1 to about 10 parts by weight of the fine polyorganosilsesquioxane particles.

3. The thermoplastic resin composition according to claim 1, wherein the rubber-modified vinyl graft copolymer is prepared by graft polymerization of a monomer mixture comprising an aromatic vinyl monomer and a vinyl cyanide monomer to a rubber polymer having an average particle diameter of about 100 nm to about 600 nm.

4. The thermoplastic resin composition according to claim 1, wherein the rubber-modified vinyl graft copolymer is an acrylonitrile-butadiene-styrene graft copolymer (g-ABS) or an acrylate-styrene-acrylonitrile graft copolymer (g-ASA).

5. The thermoplastic resin composition according to claim 1, wherein the large-diameter rubber polymer is present in the form of a rubber-modified aromatic vinyl copolymer resin prepared through continuous solution polymerization of a rubber polymer having a viscosity of about 150 cP or more in a 5 wt % styrene solution, an aromatic vinyl monomer, and a monomer copolymerizable with the aromatic vinyl monomer.

6. The thermoplastic resin composition according to claim 1, wherein the aromatic vinyl copolymer resin is a polymer of an aromatic vinyl monomer and a monomer copolymerizable with the aromatic vinyl monomer.

7. The thermoplastic resin composition according to claim 1, wherein the fine polyorganosilsesquioxane particles are prepared by mixing an organochlorosilane with an organotrialkoxysilane to form a mixture containing about 100 ppm to about 2,000 ppm of the organochlorosilane, and mixing water with the mixture to form a transparent sol while maintaining pH of the mixture in the range of about 8 to about 11.

8. The thermoplastic resin composition according to claim 1, wherein the fine polyorganosilsesquioxane particles have an average particle diameter of about 4 μm to about 7 μm.

9. The thermoplastic resin composition according to claim 1, wherein the thermoplastic resin composition has a gloss of about 5% to about 25%, as measured on a 1.5 mm thick specimen at an angle of 60° in accordance with ASTM D523.

10. The thermoplastic resin composition according to claim 1, wherein the thermoplastic resin composition has a color variation (ΔE) of about 0.5 to about 3.0, as calculated by Equation 1 based on initial color values ($L_0^*$, $a_0^*$, $b_0^*$) measured on an injection-molded specimen having a size of 50 mm× 90 mm× 3 mm using a colorimeter and color values ($L_1^*$, $a_1^*$, $b_1^*$) of the specimen measured using the colorimeter after weathering testing for 2,000 hours in accordance with ASTM D4459:

$$\text{Color variation } (\Delta E) = \sqrt{(\Delta L^*)^2 + (\Delta a^*)^2 + (\Delta b^*)^2} \quad \text{[Equation 1]}$$

where ΔL* is a difference ($L_1^*-L_0^*$) between L* values before/after weathering test; Δa is a difference ($a_1^*-a_0^*$) between a* values before/after weathering test; and Δb is a difference ($b_1^*-b_0^*$) between b* values before/after weathering test.

11. The thermoplastic resin composition according to claim 1, wherein the rubber-modified vinyl graft copolymer, the large-diameter rubber polymer and the fine polyorganosilsesquioxane particles are present as dispersed phases in a continuous phase comprising the aromatic vinyl copolymer resin.

12. A molded product formed of the thermoplastic resin composition according to claim 1.

* * * * *